UNITED STATES PATENT OFFICE.

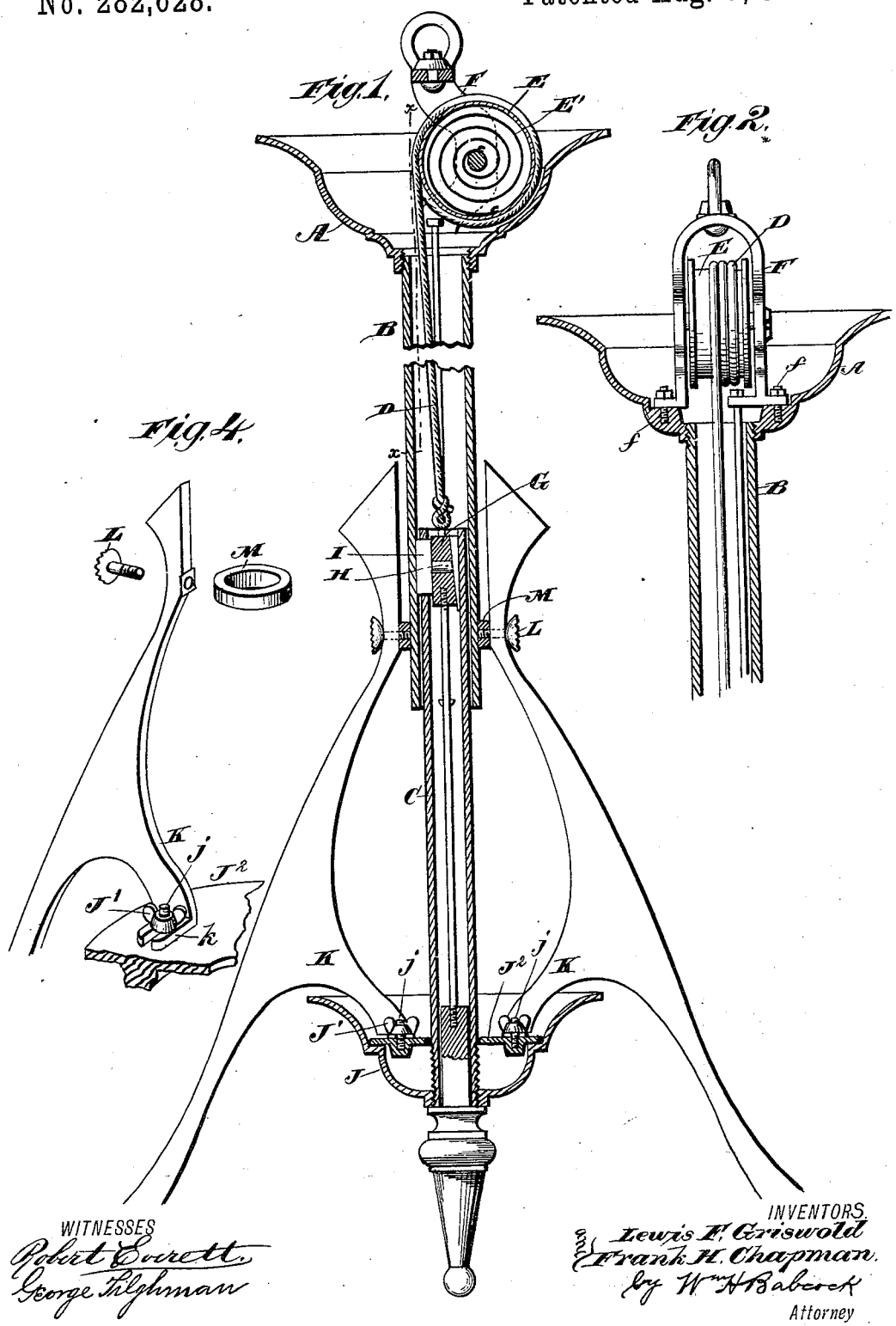

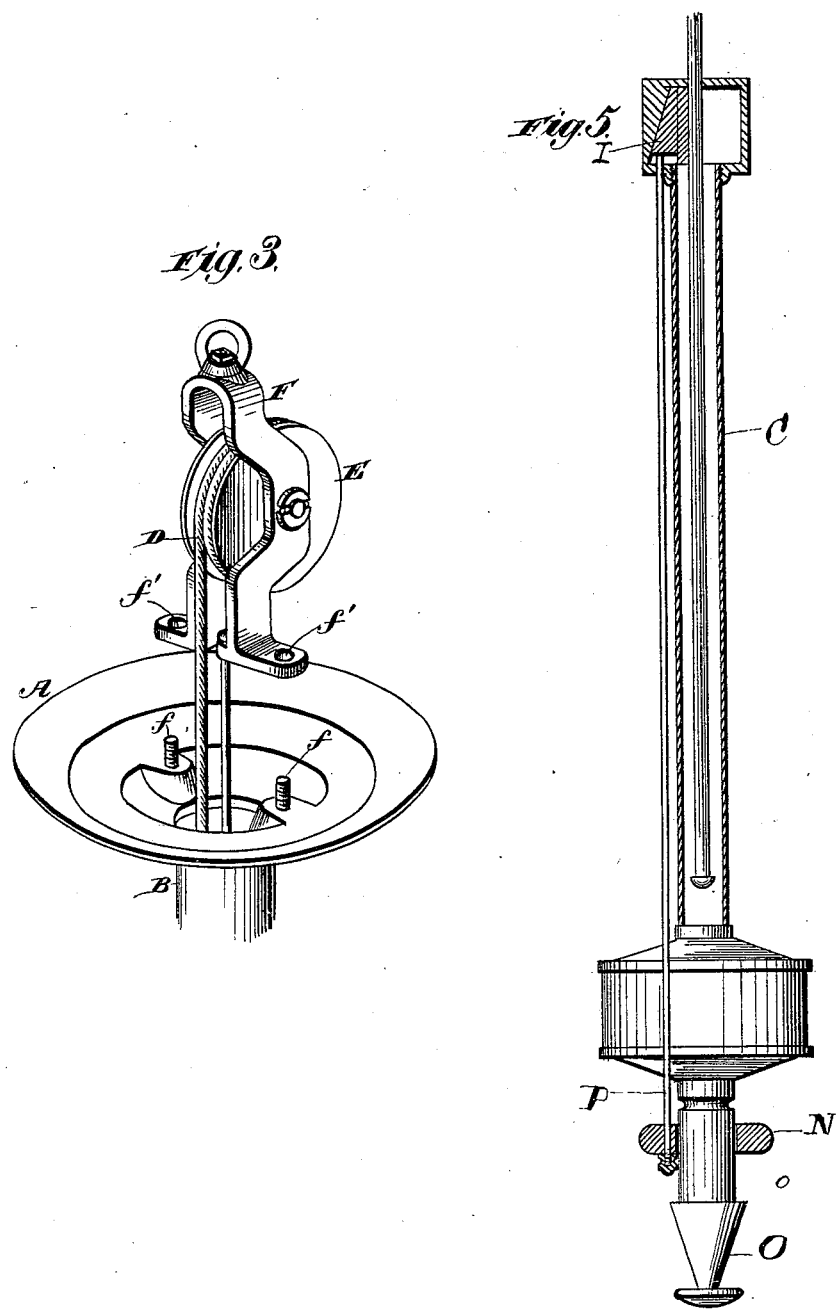

LEWIS F. GRISWOLD AND FRANK H. CHAPMAN, OF MERIDEN, CONNECTICUT, ASSIGNORS TO THE CHARLES PARKER COMPANY, OF SAME PLACE.

EXTENSION-FIXTURE FOR CHANDELIERS.

SPECIFICATION forming part of Letters Patent No. 282,628, dated August 7, 1883.

Application filed June 8, 1883. (No model.)

*To all whom it may concern:*

Be it known that we, LEWIS F. GRISWOLD and FRANK H. CHAPMAN, citizens of the United States, residing at Meriden, in the county of New Haven and State of Connecticut, have invented certain new and useful Improvements in Extension-Fixtures for Chandeliers; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to extension-fixtures for chandeliers and drop-lights; and it consists partly in certain improvements in the devices for sustaining the drum to which the suspension rope or chain for the lower tube is attached, and partly in certain devices for attaching the chandelier-arms to the movable part of the extension-fixture, substantially as hereinafter described.

In the accompanying drawings, Figure 1 represents a vertical section through an extension chandelier-fixture embodying our invention. Fig. 2 represents a section through the upper part thereof, on the line $x\,x$ of Fig. 1. Fig. 3 represents a perspective view from above of the canopy and the devices (except the upper tube) normally attached thereto, these devices being shown as displaced. Fig. 4 represents a detail view of one of the brackets for the arms and the fastening devices therefor. Fig. 5 represents a side elevation, partly in section, of the lower part of an extension-fixture provided with our improved releasing devices.

A designates the canopy of an extension chandelier-fixture; B, the upper tube, which is attached thereto; C, the movable lower tube; D, the suspension cord or chain for said lower tube; E, the drum on which said cord is wound, and E' a clock-spring within said drum, which operates to draw said cord or chain upward. This drum is journaled within standards F, formed of a single bent bar, which has its lower ends detachably bolted to said canopy on a line passing through the center thereof. This bolting is preferably effected by screw-threaded studs $f\,f$, which are formed with said canopy, and extend up through openings $f'\,f'$ in the feet of said standards. Above said feet they receive the nuts which lock said standards in place. The said bar is bent near the middle of its height so far away from the center of the canopy that the edge of the drum is over the central opening in the latter, and the cord or chain extends down through the upper tube, B, vertically (or nearly so) without the aid of a guide. The lower end of the cord or chain is attached to a sliding block, G, which carries a transversely-moving piece, H, that is adapted to actuate a movable shoe, I, when said piece is drawn against an inclined rib on the inner face of lower tube, C. This forces said shoe through an opening in said lower tube against the inner face of the fixed outer tube, B. No further description is needed, as we do not claim to have invented these devices, and other clamping mechanism may be substituted.

J designates the center box, which is saucer-shaped and screwed on the lower end of the lower tube, C. It has a horizontal circular plate or partition, $J^2$, formed upon it near its upper edge, and on this studs $j$ are formed at suitable intervals. K designates brackets formed, respectively, on the inner ends of the arms which are to be attached to this box. Each bracket has a slotted foot, $k$, which receives one of said screw-threaded studs $j$. A nut, J', is then screwed home on the same. Each bracket is extended up to or beyond the upper end of the lower tube, C, and is attached to the upper tube, B, near the lower end of the latter, by a screw, L, which passes through said bracket into a collar, M, which surrounds said tube B. The same collar serves for the attachment of the whole series of said brackets. It may be provided with a lining or bushing of soft material on its inner side to prevent scratching the tube B. As this collar moves freely up and down over said upper tube, it allows the chandelier-arms to rise and fall with the lower tube without straining or encountering any impediment, although said arms are effectually braced above and below by the attachment of said brackets to said tubes. The latter are also braced by said brackets. The construction of parts is very simple, dispensing entirely with the usual body and top plate of the center box. It allows all the parts to be easily and expeditiously detached.

As shown in Fig. 5, we prefer to employ, instead of the movable bottom tip hereinbefore described, a collar, N, sliding on a cylindrical part, o, of a bottom tip, O, the latter being immovable with respect to the lower tube of the fixture. This collar is attached to the rod P, whereby the wedge I is drawn down to release the said movable tube, so that it may be moved up or down, as desired. By this construction, combination, and arrangement of the releasing devices, we are enabled to extend or contract the fixture without removing the bottom tip from its normal place on the lower end of the lower tube. There is also no need to make slots in the tube, as there is when a finger-bar is employed.

Having thus described our invention, what we claim as new, and desire to secure by Letters Patent, is—

1. In an extension lamp-fixture, the standards F, provided with feet having openings $f'$, in combination with canopy A, having screw-threaded studs $f$, which extend upward through said openings, the nuts which turn home on said studs to fasten said feet to said canopy, the drum E, which has its bearings in said standards, and the suspension-cord D, which is attached to said drum, and operates substantially as set forth.

2. In combination with the fixed upper tube and the movable lower tube of a chandelier-fixture, a series of arms attached to a center box on said lower tube, and also to a collar movable on said upper tube, substantially as set forth.

3. A center box, J, attached to the lower tube of a chandelier extension-fixture, in combination with the upper tube of said fixture, a collar movable on said upper tube, and a bracket, K, detachably fastened to said center box and collar, for the purpose of attaching a chandelier-arm to said fixture, substantially as set forth.

4. A cup-shaped center box, J, provided with horizontal plate $J^2$, and screw-threaded studs $j$ raised thereon, in combination with brackets K on the inner ends of the chandelier-arms, having slotted feet $k$, adapted to receive said studs, and the nuts $J'$, which are turned home on said studs to clamp said feet against said plate, substantially as set forth.

5. In combination with the movable and immovable parts of an extension lamp-fixture or extension chandelier-fixture, a bottom tip which is immovable with respect to said movable part, a collar which moves up and down over a part of said tip, and a rod extending from said collar to the clamping devices, substantially as set forth.

6. In combination with the fixed rod or tube forming the upper part of the chandelier or lamp fixture, and the movable tube forming the lower part thereof, a spring-actuated clamping device for locking said tube, a collar sliding on the exterior of said tube or an attachment thereof, and a rod extending from said collar to said clamping device, in order that the latter may be withdrawn from operation at will, substantially as set forth.

In testimony whereof we affix our signatures in presence of two witnesses.

LEWIS F. GRISWOLD.
FRANK H. CHAPMAN.

Witnesses:
DEXTER W. PARKER,
RALPH A. PALMER.